United States Patent
Lindoff et al.

(10) Patent No.: US 8,270,509 B2
(45) Date of Patent: Sep. 18, 2012

(54) DETERMINING A FREQUENCY ERROR IN A RECEIVER OF A WIRELESS COMMUNICATIONS SYSTEM

(75) Inventors: Bengt Lindoff, Bjärred (SE); Leif Wilhelmsson, Dalby (SE); Fredrik Nordström, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 382 days.

(21) Appl. No.: 12/598,613

(22) PCT Filed: May 5, 2008

(86) PCT No.: PCT/EP2008/055454
§ 371 (c)(1),
(2), (4) Date: Nov. 3, 2009

(87) PCT Pub. No.: WO2008/135541
PCT Pub. Date: Nov. 13, 2008

(65) Prior Publication Data
US 2010/0135423 A1  Jun. 3, 2010

Related U.S. Application Data

(60) Provisional application No. 60/916,325, filed on May 7, 2007.

(30) Foreign Application Priority Data

May 3, 2007 (EP) ..................................... 07388030

(51) Int. Cl.
  *H04K 1/10*  (2006.01)
(52) U.S. Cl. ........................................ 375/260; 375/316
(58) Field of Classification Search .................. 375/260, 375/316, 149; 370/208–210
See application file for complete search history.

(56) References Cited

U.S. PATENT DOCUMENTS

| 2004/0114675 A1* | 6/2004 | Crawford | 375/149 |
| 2005/0036564 A1* | 2/2005 | Peter et al. | 375/260 |
| 2006/0198449 A1* | 9/2006 | De Bart et al. | 375/260 |

* cited by examiner

*Primary Examiner* — Emmanuel Bayard
(74) *Attorney, Agent, or Firm* — Roger S. Burleigh

(57) ABSTRACT

A frequency error of received signals in an OFDM receiver of a wireless communications system is determined. Symbols of a given duration are transmitted as cells on sub-carrier frequencies; and some of the cells are pilot cells modulated with reference information. The method comprises the steps of selecting at least three pilot cells ($p_0$, $p_1$, $p_2$) from different symbols and different sub-carriers; determining the symbol and the sub-carrier on which each pilot cell is transmitted; determining for each pilot cell a phase difference between received and generated signals; calculating therefrom a change in phase difference ($\Phi_x$) caused by the frequency error; and calculating the frequency error from the calculated change in phase difference ($\Phi_x$). In this way a receiver capable of determining a frequency error also in situations where only a short data burst, such as a single resource block, is available for the estimation is provided.

21 Claims, 6 Drawing Sheets

DETERMINING A FREQUENCY ERROR IN A RECEIVER OF A WIRELESS COMMUNICATIONS SYSTEM

This application claims the benefit of U.S. Provisional Application No. 60/916,325 filed on May 7, 2007, the disclosure of which is fully incorporated herein by reference.

TECHNICAL FIELD OF THE INVENTION

The invention relates to determining, in a receiver of a wireless communications system employing Orthogonal Frequency Division Multiplexing, a frequency error of received signals compared to corresponding signals generated in the receiver.

DESCRIPTION OF RELATED ART

In the forthcoming evolution of the mobile cellular standards like Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from existing cellular systems to the new high capacity high data rate system in existing radio spectrum, the new system has to be able to operate in a flexible bandwidth. A proposal for such a new flexible cellular system is Third Generation (3G) Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Furthermore, data rates up to 100 Mb/s will be supported for the largest bandwidth.

However, not only high rate services are expected to use 3G LTE, but also low rate services like voice. Since 3G LTE is designed for the Transmission Control Protocol/Internet Protocol (TCP/IP), Voice over Internet Protocol (VoIP) will be the service carrying speech. Packet based VoIP makes it possible to employ power saving techniques like in GSM, i.e. turning off the receiver and transmitter between VoIP packets.

However, in order to make that work it is required that both time and frequency can be estimated accurately enough using only the data available in the short bursts carrying VoIP packets. In 3G LTE, there are specific symbols dedicated for time and frequency estimation, but these symbols are rarely transmitted, and if the receiver would have to use such a symbol to be able to demodulate a VoIP packet, the power saving would be much reduced. Alternative ways of estimating and tracking time and frequency typically rely on the data being sent continuously, like for instance in Digital Video Broadcast-Terrestrial (DVB-T), or at least on the duration of the transmission being sufficiently long.

In LTE, the data is transmitted in something referred to as a resource block, which corresponds to data being sent using a certain number of sub-carriers during a certain time, e.g. corresponding to a few symbols. When an application requires high data rates, several resource blocks can be allocated in parallel and sent continuously, and when an application requires only a low data rate, then a resource block can be sent at regular intervals. For instance, if the duration of a resource block is 0.5 ms, a resource block transmitted every 20 ms might suffice in order to support VoIP. In fact, it might be that single resource blocks are transmitted at even longer intervals, implying that it might not be feasible to estimate time and frequency using two or more resource blocks.

Frequency estimation algorithms are well known in the art and used both in GSM and WCDMA and are also used in current OFDM systems like Digital Video Broadcast-Handheld (DVB-H) and Wireless Local Area Network (WLAN). As the OFDM signal comprises many separately-modulated subcarriers, each symbol may be considered to be divided into cells, each corresponding to the modulation carried on one sub-carrier during one symbol. Some of these cells are pilot cells that are modulated with reference information, whose transmitted value is known to the receiver. According to 3G LTE nomenclature, the cells may also be referred to as resource elements, and pilot cells may be referred to as pilot symbols or reference symbols. In the following the terms cells and pilot cells will be used.

The basic idea with these algorithms is to consider how much the phase has changed between two instants of time. In OFDM systems this idea could be used when frequency estimation is done using the cyclic prefix, which is done prior to the Fast Fourier Transform (FFT). The idea could also be used when frequency estimation is done after the FFT. Then pilot cells on the same sub-carrier might be used. For DVB-T, there are so-called continuous pilots, which are very suitable for this. Also in case the pilots are sent on the same sub-carrier, but not continuously, the same approach can be taken with trivial modifications.

One example of frame and frequency synchronization in an OFDM receiver is known from EP 1 507 378, in which pairs of reference pilot cells corresponding to the same discrete frequency (i.e. the same sub-carrier) and to different discrete times are used for the synchronization.

However, as described, in case the transmission consists of very short bursts, like single resource blocks, then it might very well be that there are no pilots available on the same sub-carrier, in which case the approach described above no longer works. One possibility could then be to use pilots from different sub-carriers, but the fundamental problem using pilot symbols that are transmitted on different sub-carriers for frequency offset estimation is that the phases for the different sub-carriers are typically affected in a different and unknown way. This means that the phase difference between two symbols that would otherwise be an adequate measure of the frequency offset essentially becomes useless for frequency offset estimation.

Obviously, then, if one considers the phase difference between two pilot cells that are on two adjacent sub-carriers and in consecutive OFDM symbols, and finds a certain phase difference, it might be because of the channel, it might be because of sub-carrier frequency offset, or it might be because of a combination of both. In any event, it is obviously so that the accuracy of the frequency estimate based on the above mentioned phase difference will be limited by the uncertainty regarding how frequency selective the channel is.

Also, if frequency offset is to be estimated by considering the phase difference between two adjacent sub-carriers and in consecutive OFDM symbols, the accuracy might be limited by the uncertainty in where the FFT window is positioned.

Consequently, in order to support services that are using single resource blocks which are transmitted relatively far apart, there is a need for time and frequency estimation that can be used when only a single resource block is available. In particular frequency estimation, if done after the FFT according to the prior art, relies on pilot cells being transmitted on the same sub-carrier. When this is the case the frequency can be estimated using well-known methods. If the transmission is continuous, or at least the data is sent in long enough packets, this requirement is typically fulfilled. However, if data is transmitted in very short bursts, like single resource blocks, then there will typically not be more than one pilot available on a single sub-carrier, making standard approaches for frequency estimation useless.

Consequently, there is a need for algorithms for frequency estimation that work also when the available pilot cells are not transmitted on the same sub-carrier.

SUMMARY

Therefore, it is an object of the invention to provide a method of determining a frequency error, which can be used in situations where no pilot cells or reference symbols are available on the same sub-carrier, e.g. because the observed data block has a very short duration.

According to the invention the object is achieved in a method of determining, in a receiver of a wireless communications system employing Orthogonal Frequency Division Multiplexing, a frequency error of received signals compared to corresponding signals generated in the receiver; wherein the received signals comprise symbols, each symbol of a given duration being transmitted as a number of cells on a corresponding number of sub-carrier frequencies; and wherein some of said cells are pilot cells modulated with reference information whose transmitted value is known to the receiver; the method comprising the step of determining a change from one symbol to another of a phase difference between said received and generated signals. The object is achieved in that the method further comprises the steps of selecting at least three pilot cells from at least two different symbols, each of said at least three pilot cells being selected from a different sub-carrier frequency; determining a position for each of said at least three pilot cells, the position of a pilot cell being defined as the symbol and the sub-carrier frequency on which the pilot cell is transmitted; determining for each of said at least three pilot cells a phase difference between said received and generated signals; determining, from said determined phase differences, for each of at least two selected pairs of said at least three pilot cells a change of phase difference between the two pilot cells of the pair; calculating a change in phase difference caused by said frequency error as a weighted sum of said determined phase changes using the positions of each of said at least three pilot cells; and calculating the frequency error from said calculated change in phase difference.

As mentioned above, the phase difference between the received signals and the signals generated in the receiver for a pilot cell may change as a function of the frequency error, which depends on the time, and as a function of the sub-carrier of the cell. The change with time, i.e. due to the frequency error, can normally be considered as being linear, at least within a few symbols as it is the case for a single resource block. Similarly, if the difference between the sub-carrier frequencies of the pilot cells is not too big, as it would be the case within a resource block, and/or if the frequency selective channel is approximately linear, it will also be possible to approximate the sub-carrier dependent phase change as a linear change. In other words, the phase difference varies in a linear plane as a time and sub-carrier frequency. Thus if the phase difference for three pilot cells is measured this linear plane, and thus also its slope corresponding to a phase change as a function of time or frequency error, can easily be determined. This phase change then provides the frequency error.

The step of calculating the change in phase difference caused by said frequency error may further comprise the steps of determining for each selected pair a weighting factor in dependence of a distance in sub-carrier frequency and a distance in time between the two cells of the pair; and calculating said change in phase difference caused by said frequency error as a weighted sum of said determined phase changes by using said determined weighting factors. Using such weighting factors ensures that the weighted sum provides the change in phase difference caused by the frequency error, or in other words that the effect of the sub-carrier dependent phase change is cancelled. It is noted that dependent on how the pairs of pilot cells are selected the weighting factors may be positive or negative.

In one embodiment, the method further comprises the step of selecting the pairs of pilot cells such that the two pilot cells of each pair are received in different symbols.

In that case, the method may further comprise the step of performing the calculating steps using phase representation.

When the method further comprises the step of selecting the pilot cells from only two different symbols; and calculating said change in phase difference caused by said frequency error as a weighted average of said determined phase changes, a relatively simple method of calculating the change in phase difference caused by the frequency error is achieved.

Especially, when the method further comprises the step of selecting the pilot cells such that the sum of indices for the sub-carrier frequencies for the pilot cells selected from one of the two different symbols equals the sum of indices for the sub-carrier frequencies for the pilot cells selected from the other one of the two different symbols; and calculating said change in phase difference caused by said frequency error as the average of said determined total phase changes, the computational complexity is kept at a minimum.

As an alternative to performing the calculating steps using phase representation, the method may further comprise the step of performing the calculating steps using complex representation of the signals.

In another embodiment, the method further comprises the step of selecting the pairs of pilot cells such that at least the two pilot cells of a first pair are received in the same symbol.

In that case, the steps of determining a change of phase difference between the two pilot cells of each pair and of calculating the change in phase difference caused by said frequency error may further comprise the steps of determining the change of phase difference between the two pilot cells of said first pair; calculating therefrom a sub-carrier frequency dependent change of phase difference; determining the change of phase difference between the two pilot cells of a second pair that is received in different symbols; and calculating said change in phase difference caused by said frequency error by subtracting the calculated sub-carrier frequency dependent change of phase difference multiplied by a factor indicating the distance in sub-carrier frequency between the pilot cells of said second pair from the change in phase difference determined for the second pair. This means that effectively the sub-carrier dependent phase change is estimated first, and its effect is then subtracted from the total phase change measured between a pair of pilot cells chosen from different symbols and different sub-carriers.

In still another embodiment, the step of calculating the change in phase difference caused by said frequency error is performed by least squares estimation. This embodiment is especially feasible when more than three pilot cells are available for the estimation.

As mentioned, the invention also relates to a receiver for a wireless communications system employing Orthogonal Frequency Division Multiplexing, wherein the received signals comprise symbols, each symbol of a given duration being transmitted as a number of cells on a corresponding number of sub-carrier frequencies; and wherein some of said cells are pilot cells modulated with reference information whose transmitted value is known to the receiver; the receiver being arranged to determine a frequency error of received signals compared to corresponding signals generated in the receiver by determining a change from one symbol to another of a phase difference between said received and generated signals. When the receiver comprises means for selecting at least three pilot cells from at least two different symbols, each of said at least three pilot cells being selected from a different sub-carrier frequency, and determining a position for each of said at least three pilot cells, the position of a pilot cell being defined as the symbol and the sub-carrier frequency on which the pilot cell is transmitted, means for determining for each of said at least three pilot cells a phase difference between said received and generated signals, means for determining, from said determined phase differences, for each of at least two selected pairs of said at least three pilot cells a change of phase difference between the two pilot cells of the pair, and calculating a change in phase difference caused by said frequency error as a weighted sum of said determined phase changes using the positions of each of said at least three pilot cells, and means for calculating the frequency error from said calculated change in phase difference, then a receiver capable of determining a frequency error also in situations where only a short data burst, such as a single resource block, is available for the estimation is provided.

Embodiments corresponding to those mentioned above for the method also apply for the receiver.

The receiver may be a receiver of a mobile telephone.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

In Orthogonal Frequency Division Multiplexing (OFDM) systems a multi carrier approach, in which an original data stream is multiplexed into a number of parallel data streams with a correspondingly low symbol rate, is used to reduce inter symbol interference (ISI) by reducing the symbol rate without reducing the data rate. The inter symbol interference is caused by delay spread of the channel impulse response for the multipath channel over which the signals are transmitted. Each of the parallel data streams are modulated with a different sub-carrier frequency and the resulting signals are transmitted together in the same band from a transmitter to a receiver. Typically, a high number of different sub-carrier frequencies, i.e. several hundreds or even thousands, will be used, and these frequencies need to be very close to each other. In the receiver a Fast Fourier Transform (FFT) is used for separating the parallel data streams and recovering the original data stream.

To further reduce the inter symbol interference, each OFDM symbol constituted by the set of sub-carriers is transmitted with a duration $T_S$, which is composed of two parts, a useful part with duration $T_U$ and a guard interval (GI) or cyclic prefix (CP) with a duration $T_G$. The guard interval consists of a cyclic continuation of the useful part $T_U$ and precedes the symbol as a prefix.

Figure 1:
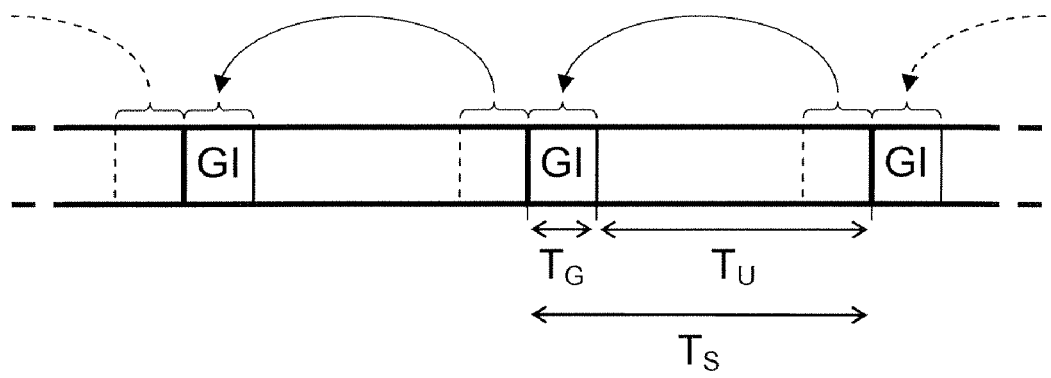
FIG. 1 shows how an OFDM symbol is composed of a useful part and a guard interval.

This is illustrated in FIG. 1, in which $T_U$ is the length of the useful part of the symbol, while $T_G$ is the length of the guard interval. As long as $T_G$ is longer than the maximum channel delay, all reflections of previous symbols can be removed in the receiver by disregarding the guard interval, and inter symbol interference can thus be avoided.

As the OFDM signal comprises many separately-modulated sub-carriers, each symbol is considered to be divided into cells, each corresponding to the modulation carried on one sub-carrier during one symbol.

Generally, to ensure synchronization between a receiver and the received signals in a communication system, it is required that time and frequency of the received signals can be estimated accurately in the receiver. Frequency estimation algorithms are well known in the art and used e.g. in GSM and WCDMA systems, and they are also used in current OFDM systems like DVB-H and WLAN. The basic idea with these algorithms is to consider how much the phase has changed between two instants of time.

If e.g. x(t) and x(t−τ) are two samples of the received signal taken t seconds apart, and if it is further, without loss of generality, supposed that the corresponding sent signals are identical, then, loosely speaking, the difference between x(t) and x(t−τ) is a measure of how much things have changed during τ seconds. If, in order to make things more specific, it is supposed that the only reason for change is a frequency error Δf, it follows that $$x(t)=x(t-\tau)e^{i2\pi\Delta f\tau} \quad (1)$$

Therefore, algorithms for estimating Δf are often based on the variable $$z(t)=x(t)x^*(t-\tau), \quad (2)$$

because the phase of this variable corresponds to the change in phase of x from time t to time t−τ, and the frequency error could then be estimated as $$\hat{f}_{err} = \frac{\arg(z(t))}{2\pi\tau}. \quad (3)$$

In OFDM systems, the idea of detecting the change of phase between two instants of time may be used when frequency estimation is done either prior to or after the FFT. In the latter case, pilot cells on the same sub-carrier may be used, as it is the case for the OFDM used for Digital Video Broadcasting (DVB).

Figure 2:
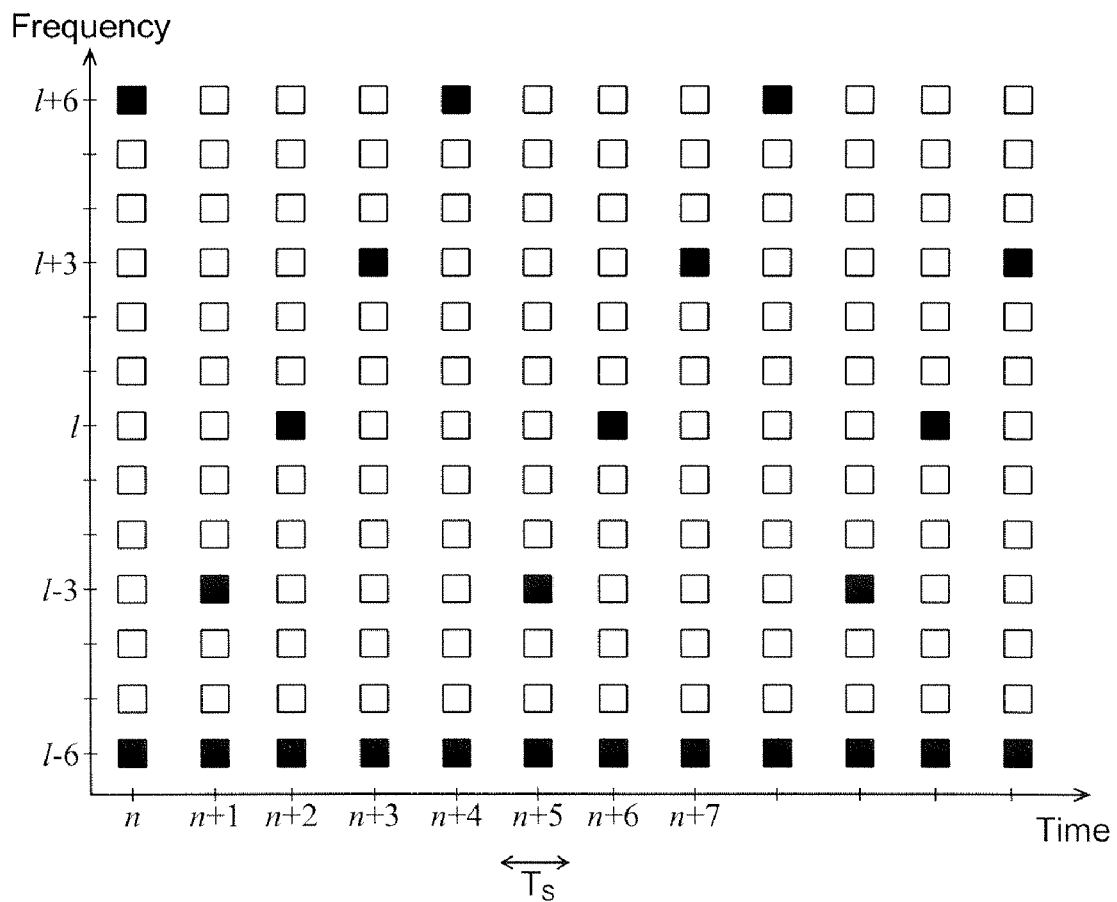
FIG. 2 shows a number of transmitted symbols comprising a number of cells corresponding to sub-carriers, wherein some cells are pilot cells.

Pilot cells are cells within the OFDM frame structure that are modulated with reference information, whose transmitted value is known to the receiver. The information may be transmitted as continual pilot cells or scattered pilot cells. This is illustrated in FIG. 2 showing a number of transmitted symbols (n, n+1, n+2, . . . ), each comprising a number of cells (1–6 to 1+6) corresponding to the sub-carriers. White cells are data cells, while the black cells are pilot cells. For illustrational purposes the number of sub-carriers shown in the figure has been limited to 13, although as mentioned above in a practical system it will normally be much higher. Continual pilot cells are shown in sub-carrier 1–6, where the pilot information is sent continuously, i.e. in every symbol, while the scattered pilot cells are transmitted on some sub-carriers intermittently. Continual pilot cells on a given sub-carrier can easily be used for detecting a change of phase between two instants of time, since the pilot information is sent continuously on that sub-carrier. However, not all systems use continual pilot cells. Also when a number of scattered pilot cells are sent on the same sub-carrier, the change of phase between two instants of time can be detected by comparing two pilot cells from the same sub-carrier. As an example, for sub-carrier 1–3 the pilot cells from symbols n+1 and n+5 can be compared.

However, when OFDM is used e.g. as multiple access technique in the downlink for 3G Long Term Evolution (3G LTE), high data rate services will be provided as well as low data rate services, such as Voice over Internet Protocol (VoIP). In the latter case, power may be saved by turning off the receiver and transmitter between VoIP packets, which means that data, i.e. symbols, are only transmitted in bursts instead of continuously. In LTE, the data is transmitted in something referred to as a resource block, which corresponds to data being sent using a certain number of sub-carriers during a certain time, which could be e.g. six or seven symbols. When an application requires high data rates, several resource blocks can be allocated in parallel and sent continuously, and when an application requires only a low data rate, then a single resource block can be sent at regular intervals. For instance, if the duration of a resource block is 0.5 ms, a resource block transmitted every 10 ms might suffice to support VoIP. In fact, it might be that single resource blocks are transmitted at even longer intervals.

Figure 3:
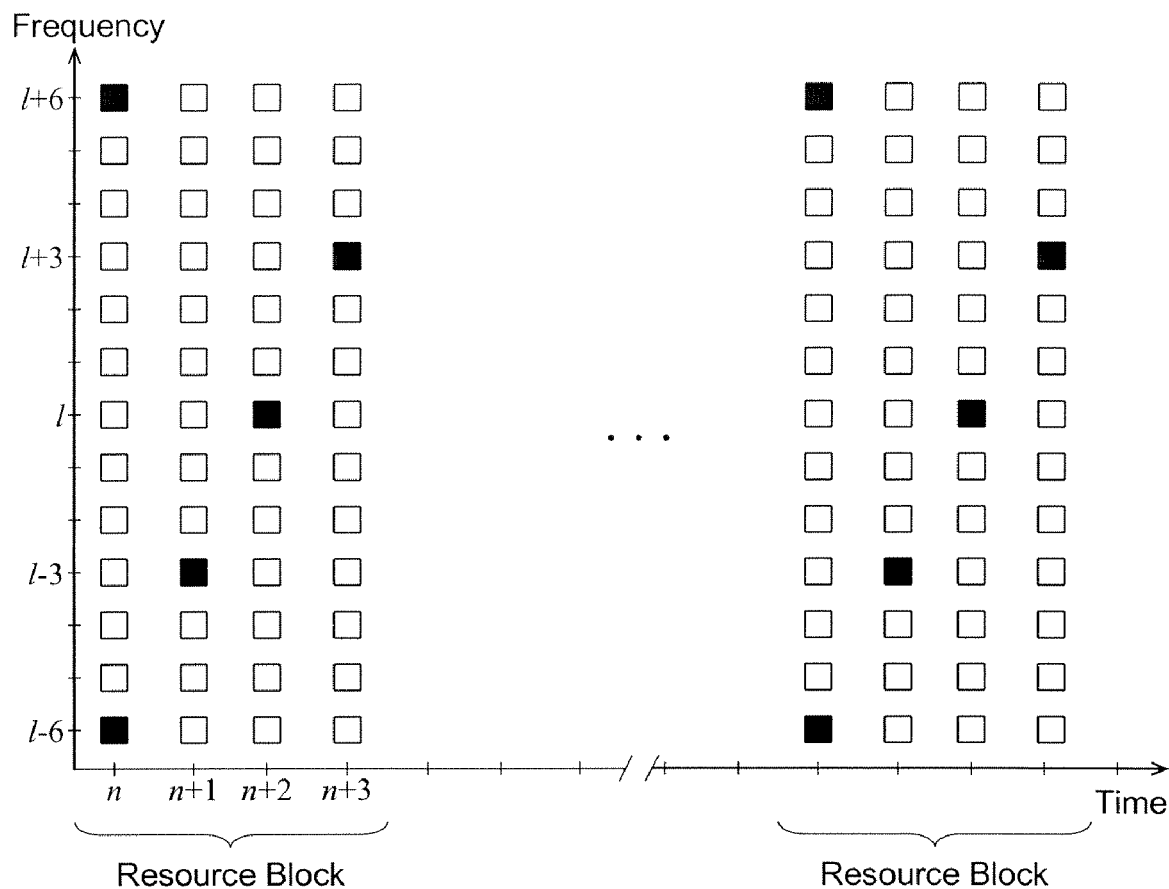
FIG. 3 shows a resource block of four symbols followed by a long interval before the next resource block.

However, when the transmission consists of very short bursts, like single resource blocks, then it might very well be that there are no pilots available on the same sub-carrier, in which case the approach described above no longer works. This is illustrated in FIG. 3, in which a resource block of four symbols is transmitted, followed by a long interval before the transmission of the next resource block. It is seen that although each resource block comprises several pilot cells, they are located on different sub-carriers, so that in a given resource block it is not possible to compare two consecutive pilot cells transmitted on the same sub-carrier in order to determine the change in phase between the two instances of time. It could be possible to compare a pilot cell on a sub-carrier in one resource block with a pilot cell on the same sub-carrier in the next resource block, i.e. after the interval, but normally the time between the two resource blocks will be so long that the change in phase could well be larger than $2\pi$, thus complicating the process of determining the change of phase. Further, of course, if the time between the two time instants is too long, the radio channel could well be changed between the symbols, thus making the results useless. The radio channel is changing due to Doppler Effect, and all comparisons between pilot cells in time are only valid assuming that the channel is changing slowly enough for the Nyquist Theorem to be fulfilled during the time interval.

Thus if the change of phase should be determined from pilot cells within a single resource block, it would be necessary to use pilot cells from different sub-carriers. However, such pilot cells are not well suited for this purpose. The fundamental problem using pilot cells that are transmitted on different sub-carriers for frequency offset estimation is that the phases for the different sub-carriers typically are affected in a different and unknown way. This means that the phase difference between two symbols that normally would be used as an adequate measure of the frequency offset essentially becomes useless for frequency offset estimation.

Below it is by means of an example further described why it is not possible to directly estimate the frequency error using two cells taken at different subcarriers in an OFDM system. Without limiting the scope, it can be assumed that the parameters for the OFDM system equal the ones currently standardized in 3GPP. Specifically, it is assumed that the spacing between the subcarriers equals 15 kHz and that the duration of the useful part of the symbol equals the reciprocal of this, i.e. $T_u$=0.067 ms. For simplicity, it is supposed that the length of the cyclic prefix is $T_G$=4.69 µs.

As mentioned, pilot cells transmitted on different sub-carriers are not well suited for frequency offset estimation because the phases for the different sub-carriers are typically affected in a different and unknown way. Reasons why different sub-carriers are affected differently might be that the channel as such is frequency selective, but it might also be caused by a synchronization error.

First, the case that the channel is frequency selective is considered, and it is supposed that the channel consists of two taps of equal strength and with a delay between the two that equals $\Delta t$ seconds. The impulse response of the channel can then, possibly after scaling, be written as $$h(t)=\delta(t)+\delta(t-\Delta t), \tag{4}$$

and the corresponding channel transfer function is given by $$H(f)=1+e^{-i2\pi f \Delta t}=2e^{-i\pi f \Delta t}\cos(\pi f \Delta t). \tag{5}$$

If it is now supposed that $\Delta t$=2 µs and that two adjacent sub-carriers are considered, according to (5) the phase difference for the channel transfer function for these sub-carriers will be $\pi f \cdot \Delta t$=0.037$\pi$=0.094 rad.

At the same time, the phase shift between two symbols on the same sub-carrier caused by a frequency error $\Delta f$ will equal $$2\pi \cdot \Delta f \cdot (T_U+T_G)=2\pi \cdot \Delta f \cdot (0.067+0.00469)\cdot 10^{-3},$$

from which it is easily verified that a frequency error of 1.32 kHz would also give a phase shift of 0.094 rad.

Obviously, then, if one considers the phase difference between two pilot symbols that are on two adjacent sub-carriers and in consecutive OFDM symbols, and finds that the phase difference equals 0.094, it might be because of the channel, it might be because of frequency offset, or it might be because a combination of both. In any event, it is obviously so that the accuracy of the frequency estimate based on such phase difference will be limited by the uncertainty regarding how frequency selective the channel is.

Figure 4:
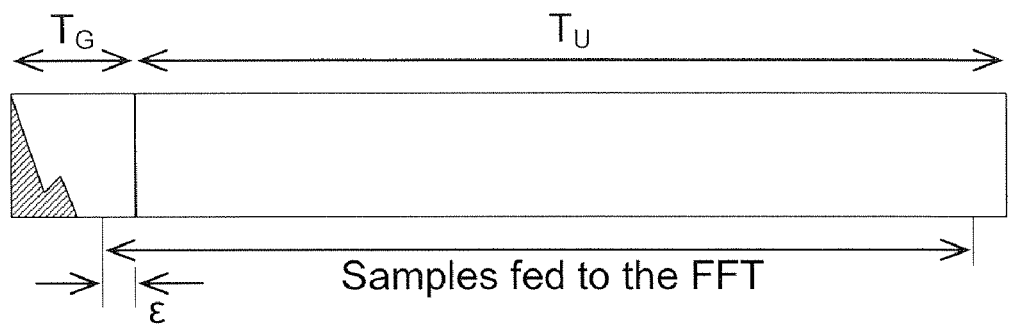
FIG. 4 shows a possible placement of an FFT window.

Second, regarding synchronization error, the case that the channel is frequency flat, but where $\epsilon$ samples from the cyclic prefix are used by the FFT, is considered, i.e. the FFT window is placed $\epsilon$ samples earlier than the latest possible position in order to avoid ISI, as seen in FIG. 4. It is noted that in this case the start of the FFT window (the samples used by the FFT) is placed in the middle of the ISI free part of the guard interval.

It can be shown that the difference in placing the FFT window as shown in the figure compared to placing it as late as possible, i.e., $\epsilon=0$, will be that the signal after the FFT in the former case will be $$X_\epsilon(l)=X(l)e^{i2\pi\epsilon l/N} \qquad (6)$$

where N is the size of the FFT and l is the index of the frequency bin at the output of the FFT, which is in the range $-N/2+1$ to $N/2$. Returning to the example where the length of the cyclic prefix was about 7% of N, an reasonable value of $\epsilon/N$ is e.g. 2%. Referring to (6), it is readily seen that this gives a phase rotation that changes by 0.12 rad per sub-carrier. Thus, if frequency offset is to be estimated by considering the phase difference between two adjacent sub-carriers and in consecutive OFDM symbols, the accuracy will be limited by the uncertainty in where the FFT window is positioned.

Thus, in order to support services that are using single resource blocks which are transmitted relatively far apart, there is a need for time and frequency estimation that can be used when only a single resource block is available. In the prior art solutions, frequency estimation, in particular if done after the FFT, relies on the fact that pilot symbols are transmitted on the same sub-carrier. When this is the case, the frequency can be estimated using well-known methods. If the transmission is continuous, or at least the data is sent in long enough packets, this requirement is typically fulfilled. However, if data is transmitted in very short bursts, like single resource blocks, then there will typically not be more than one pilot available on a single sub-carrier, making standard approaches for frequency estimation useless.

Consequently, there is a need for algorithms for frequency estimation that also work when the available pilot symbols are not transmitted on the same sub-carrier. In the following, algorithms are therefore disclosed, which solve the above mentioned problem and thus allow for reception of single resource blocks.

The described algorithms use pilot symbols in such a way that the effect of the sub-carrier frequency dependent phase rotation is cancelled, thus allowing the frequency error to be estimated, or they actually estimate the frequency dependent phase rotations. This might for instance be done jointly with estimating the frequency error, or it might be done separately.

Figure 5:
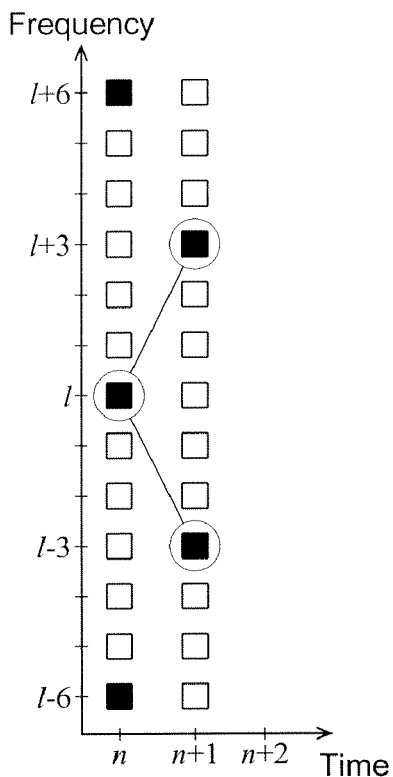
FIG. 5 shows an example of how two pairs of pilot cells may be selected.

In one embodiment the problem with a frequency dependent phase rotation is circumvented by choosing the pilot cells used for frequency estimation in such a way that the frequency dependent phase rotation is cancelled, or at least is small enough for the frequency error to be estimated with sufficient accuracy. This is achieved by properly choosing what pilots to be used for frequency estimation, and the solution is based on the assumption that when the sub-carriers of the chosen pilot cells are relatively close to each other, the frequency dependent phase rotation can be considered as a linear function. Specifically, if $p_{n,l}$ denotes the pilot that is transmitted on sub-carrier l in OFDM symbol n, and it is supposed that the frequency offset is to be estimated using pilots from symbol n and n+1, two pairs of pilots in these two OFDM symbols can be used such that the sum of the indexes of the subcarriers used for each of the two OFDM symbols is as similar as possible, and preferably equal. This is illustrated in FIG. 5, which shows how the pilot symbols might be interlaced with the data symbols in time and frequency for a resource block consisting of only two symbols, and how two pairs of pilots may be selected. Based on the discussions above, use of for instance the two pilots $p_{n,l}$ and $p_{n+1,l+3}$ would typically not give a good estimation of the frequency offset. However, it is noted that if $p_{n,l}$ is used twice and $p_{n+1,l+3}$ and $p_{n+1,l-3}$ are used once, the condition that the sum of the indices for the subcarriers is the same for each symbol is fulfilled, since $l+l=(l+3)+(l-3)$. This corresponds to saying that the distance in f domain between the two pilots of the first pair, i.e. $p_{n,l}$ and $p_{n+1,l+3}$, is equal to the distance between the two pilots of the second pair, i.e. $p_{n,l}$ and $p_{n+1,l-3}$.

In this particular case, one might interpret this way of estimating the frequency offset as follows: First, pilot cells $p_{n,l}$ and $p_{n+1,l+}3$ are used. This will result in a phase shift that is due to frequency error plus the frequency dependent phase shift that is due to the pilots being three sub-carriers apart. Next, symbols $p_{n,l}$ and $p_{n+1,l-3}$ are used. Again this will result in a phase shift that is due to frequency error plus the frequency dependent phase shift that is due to the pilots being three sub-carriers apart. However, the key property is now that whereas the phase shift that is due to frequency error will be the same in the two cases, the phase shift that is dependent on the different sub-carrier frequencies will be of the same absolute size (the distance is 3 in both cases), but with different signs. Thus, by estimating the frequency offset based on the average phase difference the effect of a frequency dependent phase is removed.

It is noted that although in this example one pilot cell is used twice, it need not be the case, as long as the condition of the sums of the sub-carrier indices being equal is fulfilled. Thus in FIG. 5 it could also be possible to use e.g. pilot cells $p_{n,l-6}$ and $p_{n+1,l-3}$ as the first pair and pilot cells $p_{n,l+6}$ and $p_{n+1,l-3}$ as the second pair, provided that the channel is not different for the two pairs, because in that case the imaginary part would not be cancelled out.

In this embodiment, the computational complexity is kept at a minimum. However, as becomes obvious from the example not all pilots are necessarily used, and some might be used more than once in order to fulfil the requirement of being insensitive to frequency dependent phase shifts, implying that the resulting estimate should be able to improve. Also, for an already designed system, the pilot positions might not be suitable for this embodiment.

This embodiment might either be carried out in the phase domain, or it might be carried out using complex representation of the signal.

Figure 6:
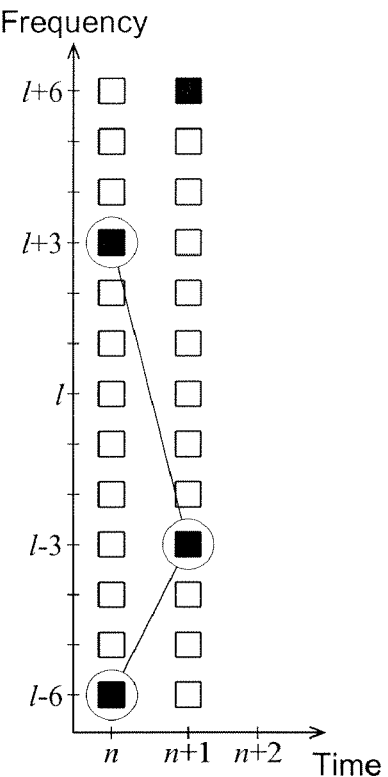
FIG. 6 shows another example of how two pairs of pilot cells may be selected.

If the pilot cells can not be selected so that the sum of the indices for the subcarriers is the same for each symbol, estimating the frequency offset can instead be based on a weighted average of the measured phase differences. This is illustrated in FIG. 6. Here the pilot cell $p_{n+1,l-3}$ is used twice while each of $p_{n,l+3}$ and $p_{n,l-6}$ is used once. First, pilot cells $p_{n+1,l-3}$ and $p_{n,l+3}$ are used. This will result in a phase shift that is due to frequency error plus the frequency dependent phase shift that is due to the pilots being six sub-carriers apart. Next, symbols $p_{n+1,l-3}$ and $p_{n,l-6}$ are used. This will result in a phase shift that is due to frequency error plus the frequency dependent phase shift that is due to the pilots being three sub-carriers apart. Thus, if the frequency error in this example is estimated as one third of the first phase shift plus two thirds of the second phase shift, the effect of a frequency dependent phase is again removed.

Figure 7:
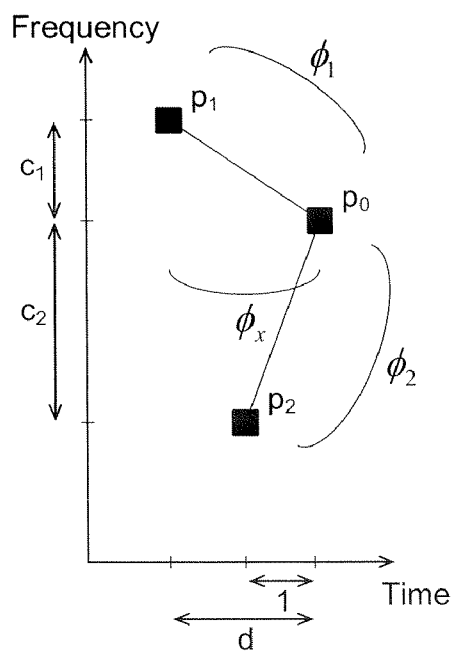
FIG. 7 shows more generally how two pairs of pilot cells may be selected.

More generally, if the pilot cells are taken from more than the two symbols shown above, the frequency error can be estimated from the measured phase rotations without estimating the "unknown" frequency dependent phase rotation. If this is done in the phase domain, and the phase is assumed to vary in a linear fashion, then this allows for the frequency error to be estimated if tree pilot cells are available. FIG. 7 illustrates how this can be done by means of three pilot cells $p_0$, $p_1$ and $p_2$. The variables used in the figure and the below equations have the following meaning:

$\phi_x$ is the phase rotation that depends only on the frequency error, and which should be used for frequency estimation.

$\phi_1$ is the measured phase rotation between pilot symbols $p_0$ and $p_1$.

$\phi_2$ is the measured phase rotation between pilot symbols $p_0$ and $p_2$.

$\phi_3$ and $\phi_4$ denote the unknown frequency dependent phase rotations between pilot symbols $p_0$ and $p_1$ and $p_0$ and $p_2$, respectively.

$c_1$ and $c_2$ are the distances in frequency between pilot cells $p_0$ and $p_1$ and pilot cells $p_0$ and $p_2$, respectively. Since it is only the ratio between $c_1$ and $c_2$ that is needed, the distance might be measured in Hz, or in number of sub-carriers.

d is the distance in time between pilot cells $p_0$ and $p_1$ relative to the distance in time between pilot cells $p_0$ and $p_2$.

From the assumption that the frequency dependent phase rotation is a linear function it follows that $$\phi_3 = \frac{-c_1}{c_2} d\phi_4. \tag{7}$$

It then follows that $$\phi_1 = \phi_x + \phi_3 = \phi_x - \frac{c_1}{c_2} d\phi_4, \tag{8}$$

and $$\phi_2 = \frac{\phi_x}{d} + \phi_4. \tag{9}$$

From (9) it is seen that $$\phi_4 = \phi_2 - \frac{\phi_x}{d},$$

which, when inserted in (8), verifies that $$\phi_1 = \phi_x - \frac{c_1}{c_2} d\left(\phi_2 - \frac{\phi_x}{d}\right), \tag{10}$$

$$\phi_1 = \phi_x - \frac{c_1}{c_2} d\phi_2 + \frac{c_1}{c_2} \phi_x,$$

$$\phi_1 + \frac{c_1}{c_2} d\phi_2 = \phi_x \left(1 + \frac{c_1}{c_2}\right),$$

$$\phi_x = \frac{c_2}{c_1 + c_2}\left(\phi_1 + \frac{c_1}{c_2} d\phi_2\right) = \frac{c_2}{c_1 + c_2}\phi_1 + \frac{c_1 d}{c_1 + c_2}\phi_2.$$

Thus it is seen that the phase rotation $\phi_x$ relating to the frequency error can be calculated as a weighted sum of the phase rotations $\phi_1$ and $\phi_2$ measured the two set of pilot cells shown in FIG. 7. The weighting factors $$\frac{c_2}{c_1 + c_2} \text{ and } \frac{c_1 d}{c_1 + c_2}$$

are calculated from the distances in time and sub-carrier frequency between the used pilot cells.

Finally, the calculated phase rotation $\phi_x$ is used to calculate the frequency error in accordance with (3), i.e.

$$\hat{f}_{err} = \frac{\phi_x}{2\pi\tau},$$

where $\tau$ is the time corresponding to d in FIG. 7.

It is noted that if d=1, the situation corresponds to the one shown in FIG. 6 with pilot cells from only two symbols, and equation (10) can then be written as $$\phi_x = \frac{c_2}{c_1 + c_2}\left(\phi_1 + \frac{c_1}{c_2}\phi_2\right) = \frac{c_2}{c_1 + c_2}\phi_1 + \frac{c_1}{c_1 + c_2}\phi_2.$$

Thus in this case $\phi_x$ is calculated as a weighted average of the measured phase rotations $\phi_1$ and $\phi_2$ in the example of FIG. 6, $c_1$=6 and $c_2$=3, and $$\phi_x = \frac{1}{3}\phi_1 + \frac{2}{3}\phi_2,$$

as it was also described above in relation to FIG. 6.

If further $c_1$=$c_2$, the situation corresponds to the one shown in FIG. 5, and equation (10) can then be written as $$\phi_x = \frac{1}{2}\phi_1 + \frac{1}{2}\phi_2,$$

i.e. the frequency error is estimated based on the average phase difference, as it was also described above in relation to FIG. 5.

In all the situations described above, the frequency error can be estimated from the phase differences measured between a number of pilot cells in such a way that the sub-carrier frequency dependent phase rotation does not affect the result.

In the above examples, the estimation of the frequency error was done in the phase domain. However, the estimation of frequency error may also be done using complex representation of the signal, rather than the phase. This is described in the following. In this example, it is assumed that a pilot cell constellation corresponding to FIG. 5, i.e. a situation in which the (time, subcarrier)-positions (n, l−Δ) and (n, l+Δ), which can be correlated with the pilot in (n+k, l), can not be found. For example this can be the case when the pilot in position (n, l) in FIG. 5 does not exist. Hence, no pair for addition and correlation can be found that fulfils the symmetry conditions described in relation to FIG. 5.

Instead, it is assumed that pilots in (n, l−$c_1$ Δ) and (n, l+$c_2$ Δ), which can be correlated with position (n+k, l), exist for some $c_1$ and $c_2$. A continuation of the example above could then be to use the pilot $p_{n,l-6}$ correlated with $p_{n+1,l-3}$ and the pilot $p_{n,l+6}$ correlated with $p_{n+1,l-3}$. The two distances from the pilot cell located at l−3 are here 3 and 9, which gives e.g. $c_1$=1, $c_2$=3 and Δ=3. It is observed that the sum of sub-carrier indices for respective pilot cells differ, and hence the frequency selective channel is not directly cancelled out as described in relation to FIG. 5. Similarly to equation (2), mathematically this can be written for the two pairs of pilot cells, in a generalized form where the received pilots are normalized with the sent pilots, as $$\left(\frac{X_{n,l-c_1\Delta}}{p_{n,l-c_1\Delta}} + \frac{X_{n,l+c_2\Delta}}{p_{n,l+c_2\Delta}}\right) \cdot \frac{X^*_{n+k,l}}{p^*_{n+k,l}}, \quad (11)$$

where $p_{n,l}$ and $X_{n,l}$ are the sent respectively the received pilot cell at (n, l). It is noted that for pilot cells the information of the cells, and thus the sent pilot cells, is known by the receiver.

Two weights $w_1$ and $w_2$ may be introduced in equation (11), which utilize that the two received pilots at time n are not at the same absolute distance in frequency from the received pilot at time n+k, $$\left(w_1 \frac{X_{n,l-c_1\Delta}}{p_{n,l-c_1\Delta}} + w_2 \frac{X_{n,l+c_2\Delta}}{p_{n,l+c_2\Delta}}\right) \cdot \frac{X^*_{n+k,l}}{p^*_{n+k,l}}. \quad (12)$$

The received pilots, normalized with the transmitted pilots, can be described by channel amplitude plus a phase rotation due to the frequency error and frequency selective channel plus some disturbance, $$\frac{X_{n,l+c\Delta}}{p_{n,l+c\Delta}} = h_l e^{i(-k\beta_t + c\Delta\beta_f)} + n_{n,l+c\Delta}. \quad (13)$$

A first order Taylor expansion around $X_{n+k,l}$ is performed on the received pilots at time n. The disturbance and higher order terms are assumed to be negligible. This is compared with the preferable value $e^{i(-k\beta_t)}$. Mathematically, this is written $$\begin{aligned}e^{i(-k\beta_t)} &= w_1 \frac{X_{n,l-c_1\Delta}}{p_{n,l-c_1\Delta}} + w_2 \frac{X_{n,l+c_2\Delta}}{p_{n,l+c_2\Delta}} \\ &\approx e^{i(-k\beta_t)}\left(h_{l+c_1\Delta} e^{i(c_1\Delta\beta_f)} + h_{l-c_2\Delta} e^{i(-c_2\Delta\beta_f)}\right) \\ &\approx w_1(1 + i(c_1\Delta\beta_f)) + w_2(1 + i(-c_2\Delta\beta_f)) \\ &= (w_1 + w_2) + i\Delta(w_1 c_1 \beta_f - w_2 c_2 \beta_f),\end{aligned}$$

where $\Delta f = \beta_t$ is the linear change due to frequency error and $\beta_f$ is the linear change due to frequency selective channel. Without loss of generality the weights can be chosen so that $$w_1 + w_2 = 1. \quad (14)$$

The weights can be solved from a linear equation system as a function of $c_1$ and $c_2$, $$w_1 = \frac{c_2}{c_1 + c_2}, \quad w_2 = \frac{c_1}{c_1 + c_2}.$$

The weights are reasonable since if e.g. $c_1 < c_2$, the first pilot is closer in frequency than the second one, and hence $w_1 > w_2$, which is reasonable. The Taylor expansion is good if $c_1$ and $c_2$ are not too large. Thus also in this case the frequency error can be determined from a weighted sum of the measured phase rotations, which in this case are represented by the complex notation in (12).

Figure 8:
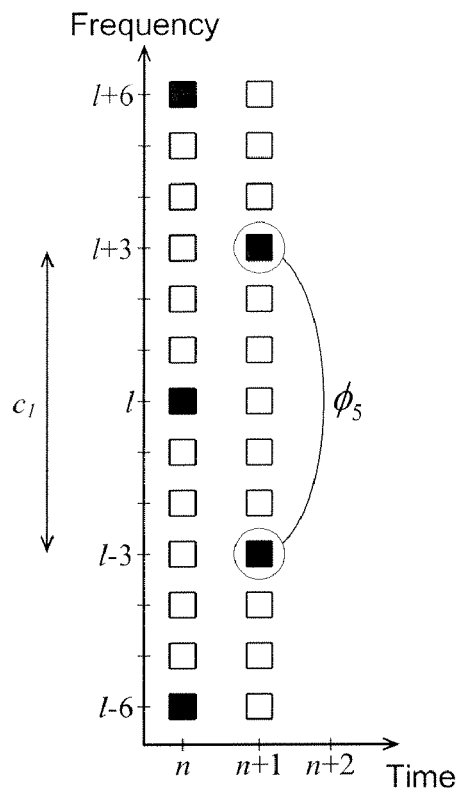
FIG. 8 shows how a first pair of pilot cells may be selected from one symbol in one embodiment.
Figure 9:
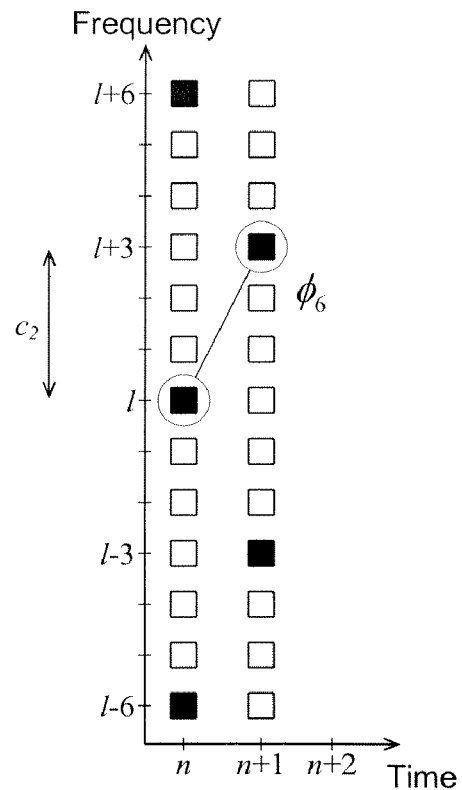
FIG. 9 shows how another pair of pilot cells may be selected from different symbols as a next step in the embodiment of FIG. 8.

The above examples show that even when pilot cells from different subcarriers, which in itself causes phase rotation, have to be used in determining the frequency error, the pilot cells can be chosen so that the frequency error can be determined from the phase rotation measured between the pilot cells without knowing the level of sub-carrier frequency dependent phase rotation. In these examples, the two pilot cells of each pair, for which a phase rotation is measured, are taken from different sub-carriers and different symbols. However, it is also possible that the pilot cells of one of the pairs are taken from the same symbol. This effectively means that the phase rotation caused by the different sub-carriers can be estimated from a first pair of pilot cells chosen from one symbol and its effect subtracted from the total phase rotation found between another pair of pilot cells chosen from different symbols. Referring to FIGS. 8 and 9, the frequency dependent phase rotation might first be estimated by considering pilots in the same OFDM symbol. Once this is estimated, pilots that are located on different sub-carriers and different symbols can be used for determining the frequency error.

The process of estimating the frequency error consists of three steps. First, it is estimated how much the phase is changed if pilots at different sub-carriers are used. This is illustrated in FIG. 8, where the phase difference $\phi_5$ between two pilot cells from symbol n+1, i.e. the pilot cell at sub-carrier l+3 and the pilot cell at sub-carrier l−3, is determined. Again, it is assumed that the sub-carriers are sufficiently close to each other for the phase rotation to be considered as a linear function, and thus that from the measured phase rotation, which in FIG. 8 corresponds to a distance of six sub-carriers, a phase rotation per sub-carrier or for three sub-carriers can easily be calculated. Next, the total phase shift $\phi_6$ between pilot cells at different sub-carriers and different OFDM symbols is measured. This is illustrated in FIG. 9, where the phase difference between pilot cells from symbol n, sub-carrier l and symbol n+1, sub-carrier l+3 is determined. Finally, the estimated impact of the fact that estimation is done on different sub-carriers is subtracted from the measured phase shift. It should be noted that the first step of this embodiment would typically require that there are more than one pilot symbol available in an OFDM symbol. Thus if (similar to the example mentioned earlier) $\phi_5$ is the phase rotation measured between two pilot cells in the same symbol (FIG. 8), q is the phase rotation measured between two pilot cells from different symbols (FIG. 9), $\phi_x$ is the phase rotation relating to the frequency error, and $c_1$ and $c_2$ are the distances in frequency between the pilot cells in FIGS. 8 and 9, respectively, $\phi_x$ for the example of FIGS. 8 and 9 can be written as $$\phi_x = \phi_6 - \frac{c_1}{c_2}\phi_5 = \phi_6 - \frac{1}{2}\phi_5.$$

This means that also in this case the phase rotation relating to the frequency error can be calculated as a weighted sum of the phase rotations measured for two sets of pilot cells.

A more general approach based on a Least Squares (LS) solution can, as an alternative to the embodiments described above, be used to determine the phase shift due to the frequency error. Such an embodiment is described in the following. Although this method can also be used for three pilot cells as in the above examples, the solution is most feasible when more than three pilots are available for estimation.

As stated above the frequency error in the FFT gives a linear shift in the phase of the symbols, which depends on the time. The frequency selective channel gives different phase shifts for different, sub-carrier frequencies, which can be any non linear function. If the difference between the maximum and minimum frequencies is not too big and/or the frequency selective channel is approximately linear, it is possible to approximate the phase shift for close frequencies as a linear change, as it has also been assumed for the previous embodiments. Close frequencies could for example be the frequencies in one LTE resource block (i.e. within 180 kHz).

The above discussion gives the model for the phase of the received pilots in one resource block as $$\phi(n,l) = \beta_0 + \beta_t(n_r) \cdot n + \beta_f l + e(n,l), \quad (15)$$

i.e. a linear plane, where n and l are time and sub-carrier for respective pilot and $n_r$ is a resource block index. The parameter $\beta_0$ is the base phase for all pilots and all phases are computed relative to this phase $\beta_f$ describes the phase shift change due to the frequency selective channel, $\beta_f \cdot l$ is the linear approximation of the change. The parameter $\beta_t(n_r)/(2\pi)$ is the estimated phase shift due to the frequency error, and hence the parameter of interest. $e(n, l)$ is introduced in order to take care of non linearity in the frequency selective channel, fading in the channel and noise in the received pilot. It may be described by a sequence of random variables given by some statistical distribution.

The phases $\phi(n,l)$ are given by $$\phi(n, l) = \arg\left(\frac{X(n, l)}{p(n, l)}\right), \quad (16)$$

where $X(n, l)$ is the received pilot symbol and $p(n, l)$ is the transmitted pilot symbol. The phases $\phi(n,l)$ must be unwrapped in order to not contain any $2\pi$ jumps.

The model (15) contains three unknown parameters (the $\beta$-parameters), which can be estimated by e.g. a least squares approach. If LS estimation of the parameters $\beta$ is used then the computations become quite simple. Let $$u_j = (1 \quad n_j \quad l_j), \quad U = \begin{pmatrix} u_1 \\ \vdots \\ u_{N_p} \end{pmatrix}, \quad \Phi = \begin{pmatrix} \phi(n_1, l_1) \\ \vdots \\ \phi(n_{N_p}, l_{N_p}) \end{pmatrix}$$

where index j is the pilot number and $n_j$ contains the constant, the time and sub-carrier index for j:th pilot. Thus U describes the locations of the available pilots. The least squares estimation of the $\beta$-parameters is then $$\hat{\beta} = \underset{\beta}{\operatorname{argmin}} \|\Phi - U\beta\|_2, \text{ which has the solution} \quad (17)$$

$$\hat{\beta} = \begin{pmatrix} \hat{\beta}_0 \\ \hat{\beta}_t \\ \hat{\beta}_f \end{pmatrix} = (U^H U)^{-1} U^H \Phi,$$

where $U^H$ is the complex conjugate transpose of the matrix U.

If $Z = (U^H U)^{-1} U^H$, then Z is a fixed matrix depending on the locations of the available pilot cells and corresponding to the weighting factors of the previous examples. This fixed matrix can be pre-computed. Since we are only interested in $\beta$-parameter, the LS calculation becomes $N_p$ multiplications and additions.

Figure 10:
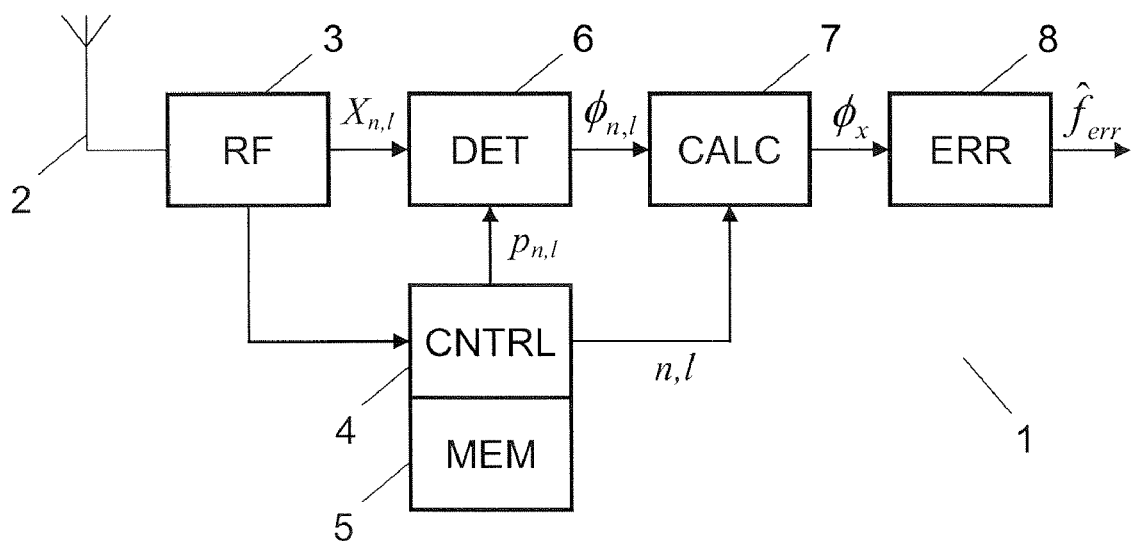
FIG. 10 shows a block diagram of a receiver in which embodiments of the invention can be implemented.

FIG. 10 shows a block diagram of a receiver 1 in which the embodiments described above can be implemented. Signals are received through the antenna 2 and processed by the RF circuit 3. This part of the circuit is well known and will not be described in further detail here. Regarding the pilot cells, the output of the circuit 3 will provide the received pilot cells $X_{n,l}$, while the corresponding sent pilot cells $p_{n,l}$ are provided by a control circuit 4 connected to a memory 5, since the information content of a pilot cell is known by the receiver and thus stored in the memory 5. The control circuit 4 also selects the pilot cells to be used for the calculations. For a given pilot cell at position (n,l), $X_{n,l}$ and $p_{n,l}$ are compared in the phase detector 6, so that the phase difference $\phi(n,l)$ between $X_{n,l}$ and $p_{n,l}$ for that pilot cell is provided. The calculating unit 7 then calculates the change in phase difference due to the frequency error according to one of the embodiments that have been described above. Finally, in the error detector 8 the calculated change in phase difference $\phi_x$ is used to calculate the frequency error, as it has also been described above.

Figure 11:
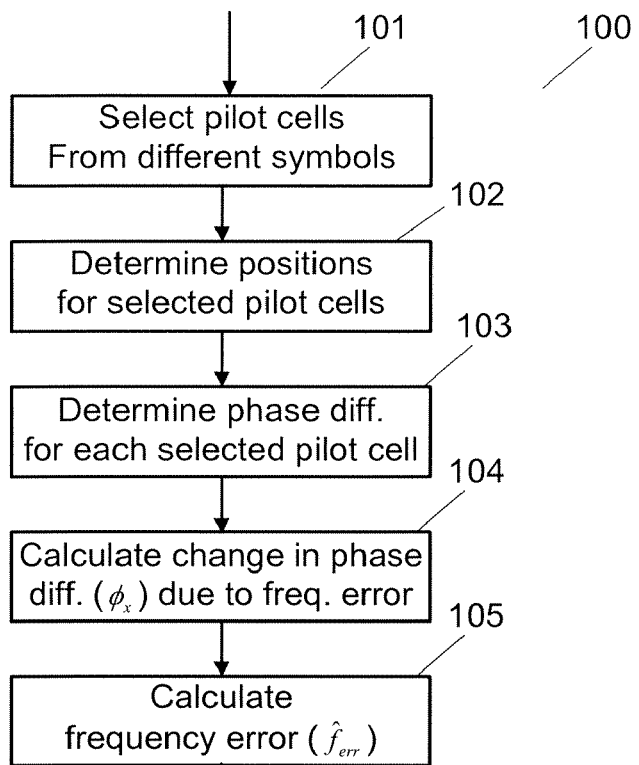
FIG. 11 shows a flow chart corresponding to the block diagram of FIG. 10.

A corresponding flow chart 100 is shown in FIG. 11. First, in step 101, the pilot cells to be used for the estimation are selected, and their positions, i.e. the symbols and the sub-carrier frequencies on which they are transmitted, are determined in step 102. Next, in step 103, the received pilot cells $X_{n,l}$ and the corresponding sent pilot cells $p_{n,l}$ are compared to determine the phase difference $\phi_{n,l}$ for each selected pilot cell. In step 104 the change in phase difference $\phi_x$ due to the frequency error is calculated according to one of the embodiments that have been described above. This step will be described in further detail below for some of the embodiments. Finally, in step 105, the calculated change in phase difference $\phi_x$ is used to calculate the frequency error, as it has also been described above.

Figure 12:
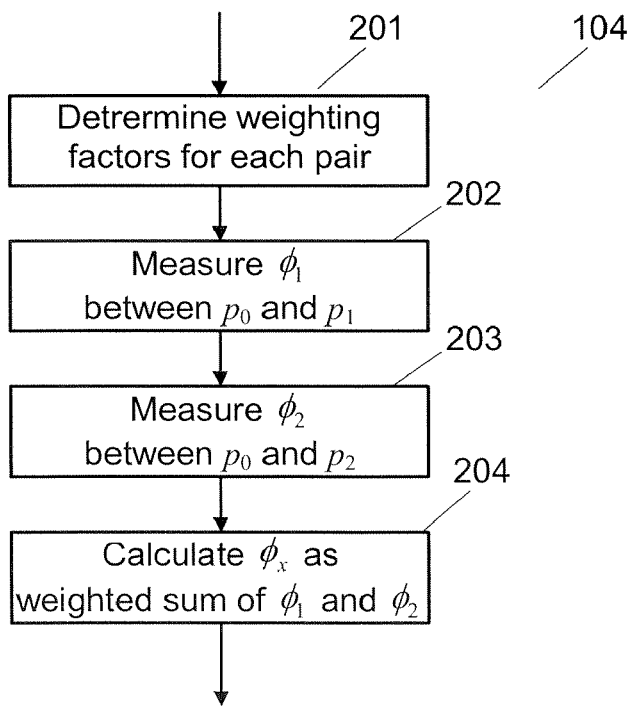
FIG. 12 shows a flow chart corresponding to the embodiment illustrated in FIG. 7.

For the embodiment illustrated in FIG. 7, the detailed steps of the calculating step 104 are shown in the flow chart in FIG. 12. First, in step 201, a weighting factor is determined for each pair of pilot cells, e.g. $p_0$ and $p_1$ respectively $p_0$ and $p_2$ in FIG. 7, from the distances in time and sub-carrier frequency between the two pilot cells of the pair. In step 202 the change in phase difference $\phi_1$ between the first pair of pilot cells $p_0$ and $p_1$ is measured. Similarly, in step 203 the change in phase difference $\phi_2$ between the second pair of pilot cells $p_0$ and $p_2$ is measured, and in step 204 the change in phase difference $\phi_x$ due to the frequency error is calculated as a weighted sum of $\phi_1$ and $\phi_2$ as it was described above in relation to FIG. 7.

Figure 13:
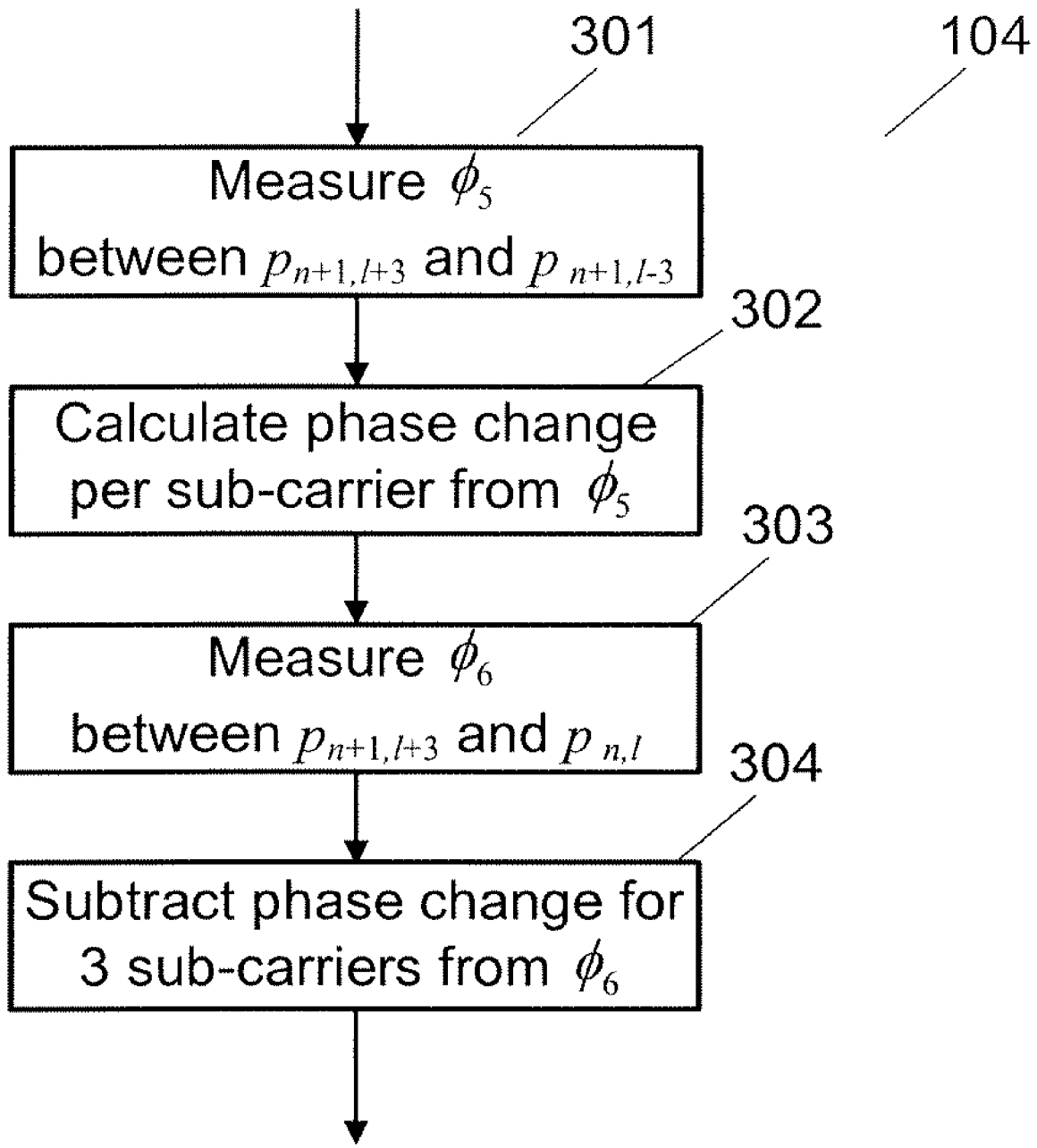
FIG. 13 shows a flow chart corresponding to the embodiment illustrated in FIGS. 8 and 9.

As another example, the flow chart in FIG. 13 shows the detailed steps of the calculating step 104 for the embodiment illustrated in FIGS. 8 and 9. In step 301 the change in phase difference $\phi_5$ between the two pilot cells in the same symbol is measured, so that a sub-carrier dependent change in phase difference can be determined therefrom in step 302. Next, in step 303, the change in phase difference $\phi_6$ between the two pilot cells in different symbols is measured, and finally, in step 304 the relevant fraction of $\phi_5$ is subtracted from $\phi_6$ to determine the change in phase difference $\phi_x$ due to the frequency error as it was described above in relation to FIGS. 8 and 9.

Although various embodiments of the present invention have been described and shown, the invention is not restricted thereto, but may also be embodied in other ways within the scope of the subject-matter defined in the following claims.

The invention claimed is:

1. A method of determining, in a receiver of a wireless communications system employing Orthogonal Frequency Division Multiplexing, a frequency error ($f_{err}$) of received signals compared to corresponding signals generated in the receiver; wherein the received signals comprise symbols, each symbol of a given duration being transmitted as a number of cells on a corresponding number of subcarrier frequencies; and wherein some of said cells are pilot cells modulated with reference information whose transmitted value is known to the receiver; the method comprising the steps of:

the receiver determining a change from one symbol to another of a phase difference between said received and generated signals, wherein the receiver determining the change further comprises the steps of:

the receiver selecting at least three pilot cells from at least two different symbols, each of said at least three pilot cells being selected from a different sub-carrier frequency;

the receiver determining a position for each of said at least three pilot cells, the position of a pilot cell being defined as the symbol and the sub-carrier frequency on which the pilot cell is transmitted;

the receiver determining for each of said at least three pilot cells a phase difference between said received and generated signals;

the receiver determining from said determined phase differences, for each of at least two selected pairs of said at least three pilot cells a change of phase difference between the two pilot cells of the pair;

the receiver calculating a change in phase difference caused by said frequency error as a weighted sum of said determined phase changes using the positions of each of said at least three pilot cells; and the receiver calculating the frequency error from said calculated change in phase difference.

2. The method according to claim 1, wherein the step of the receiver calculating the change in phase difference caused by said frequency error further comprises the steps of:

the receiver determining for each selected pair a weighting factor in dependence of a distance in sub-carrier frequency and a distance in time between the two cells of the pair; and the receiver calculating said change in phase difference caused by said frequency error as a weighted sum of said determined phase changes by using said determined weighting factors.

3. The method according to claim 2, wherein the method further comprises the step of the receiver selecting the pairs of pilot cells such that the two pilot cells of each pair are received in different symbols.

4. The method according to claim 3, wherein the method further comprises the step of the receiver performing the calculating steps using phase representation.

5. The method according to claim 4, wherein the method further comprises the steps of:

the receiver selecting the pilot cells from only two different symbols; and the receiver calculating said change in phase difference caused by said frequency error as a weighted average of said determined phase changes.

6. The method according to claim 5, wherein the method further comprises the steps of:

the receiver selecting the pilot cells such that the sum of indices for the sub-carrier frequencies for the pilot cells selected from one of the two different symbols equals the sum of indices for the sub-carrier frequencies for the pilot cells selected from the other one of the two different symbols; and the receiver calculating said change in phase difference caused by said frequency error as the average of said determined total phase changes.

7. The method according to claim 3, wherein the method further comprises the step of the receiver performing the calculating steps using complex representation of the signals.

8. The method according to claim 1, wherein the method further comprises the step of the receiver selecting the pairs of pilot cells such that at least the two pilot cells of a first pair are received in the same symbol.

9. The method according to claim 8, wherein the steps of the receiver determining a change of phase difference between the two pilot cells of each pair and the receiver calculating the change in phase difference caused by said frequency error further comprise the steps of:

the receiver determining the change of phase difference between the two pilot cells of said first pair;

the receiver calculating therefrom a sub-carrier frequency dependent change of phase difference;

the receiver determining the change of phase difference between the two pilot cells of a second pair that is received in different symbols; and the receiver calculating said change in phase difference caused by said frequency error by subtracting the calculated sub-carrier frequency dependent change of phase difference multiplied by a factor indicating the distance in sub-carrier frequency between the pilot cells of said second pair from the change in phase difference determined for the second pair.

10. A method according to claim 1, wherein the step of the receiver calculating the change in phase difference caused by said frequency error is performed by least squares estimation.

11. A receiver for a wireless communications system employing Orthogonal Frequency Division Multiplexing, adapted to receive signals comprising symbols, each symbol of a given duration being transmitted as a number of cells on a corresponding number of sub-carrier frequencies; and wherein some of said cells are pilot cells modulated with reference information whose transmitted value is known to the receiver; the receiver being arranged to determine a frequency error of received signals compared to corresponding signals generated in the receiver by determining a change from one symbol to another of a phase difference between said received and generated signals, the receiver comprising:

means for selecting at least three pilot cells from at least two different symbols, each of said at least three pilot cells being selected from a different sub-carrier frequency, and determining a position for each of said at least three pilot cells, the position of a pilot cell being defined as the symbol and the sub-carrier frequency on which the pilot cell is transmitted;

means for determining for each of said at least three pilot cells a phase difference between said received and generated signals;

means for determining, from said determined phase differences, for each of at least two selected pairs of said at least three pilot cells a change of phase difference between the two pilot cells of the pair, and calculating a change in phase difference caused by said frequency error as a weighted sum of said determined phase changes using the positions of each of said at least three pilot cells; and means for calculating the frequency error from said calculated change in phase difference.

12. The receiver according to claim 11, wherein the means for calculating the change in phase difference caused by said frequency error is further arranged to:

determine for each selected pair a weighting factor in dependence of a distance in sub-carrier frequency and a distance in time between the two cells of the pair; and calculate said change in phase difference caused by said frequency error as a weighted sum of said determined phase changes by using said determined weighting factors.

13. The receiver according to claim 12, wherein the receiver is further arranged to select the pairs of pilot cells such that the two pilot cells of each pair are received in different symbols.

14. The receiver according to claim 13, wherein the receiver is further arranged to perform the calculations using phase representation.

15. The receiver according to claim 14, wherein the receiver is further arranged to:
select the pilot cells from only two different symbols; and
calculate said change in phase difference caused by said frequency error as a weighted average of said determined phase changes.

16. The receiver according to claim 15, wherein the receiver is further arranged to:
select the pilot cells such that the sum of indices for the sub-carrier frequencies for the pilot cells selected from one of the two different symbols equals the sum of indices for the sub-carrier frequencies for the pilot cells selected from the other one of the two different symbols; and
calculate said change in phase difference caused by said frequency error as the average of said determined total phase changes.

17. The receiver according to claim 13, wherein the receiver is further arranged to perform the calculations using complex representation of the signals.

18. The receiver according to claim 11, wherein the receiver is further arranged to select the pairs of pilot cells such that at least the two pilot cells of a first pair are received in the same symbol.

19. The receiver according to claim 18, wherein the means for determining a change of phase difference between the two pilot cells of each pair and calculating the change in phase difference caused by said frequency error is further arranged to:
determine the change of phase difference between the two pilot cells of said first pair;
calculate therefrom a sub-carrier frequency dependent change of phase difference;
determine the change of phase difference between the two pilot cells of a second pair that is received in different symbols; and
calculate said change in phase difference caused by said frequency error by subtracting the calculated sub-carrier frequency dependent change of phase difference multiplied by a factor indicating the distance in sub-carrier frequency between the pilot cells of said second pair from the change in phase difference determined for the second pair.

20. The receiver according to claim 11, wherein the means for calculating the change in phase difference caused by said frequency error is arranged to use least squares estimation.

21. The receiver according to claim 11, wherein the receiver is a receiver of a mobile telephone.

* * * * *

UNITED STATES PATENT AND TRADEMARK OFFICE
CERTIFICATE OF CORRECTION

PATENT NO. : 8,270,509 B2
APPLICATION NO. : 12/598613
DATED : September 18, 2012
INVENTOR(S) : Lindoff et al.

It is certified that error appears in the above-identified patent and that said Letters Patent is hereby corrected as shown below:

In Column 8, Line 23, delete "$T_u$" and insert -- $T_U$ --, therefor.

In Column 8, Line 45, delete "$=0.037\pi$" and insert -- $=0.03\pi$ --, therefor.

In Column 10, Line 8, delete "$P_{n+1,l+3}$" and insert -- $P_{n-1,l+3}$ --, therefor.

In Column 10, Line 28, delete "$P_{n+1,l-3}$" and insert -- $P_{n+1,l+3}$ --, therefor.

In Column 11, Line 8, delete "$\phi_1$" and insert -- $\phi_3$ --, therefor.

In Column 11, Line 55, delete "$\phi$," and insert -- $\phi_x$ --, therefor.

In Column 12, Line 49, delete "(n, l-A) and (n, l+A)," and insert -- (n, l-$\Delta$) and (n, l+$\Delta$), --, therefor.

In Column 14, Line 39, delete "q" and insert -- $\phi_6$ --, therefor.

In Column 15, Line 41, delete "$n_j$" and insert -- $u_j$ --, therefor.

In Column 15, Lines 59-60, delete "$\beta$-parameter," and insert -- $\beta_t$-parameter, --, therefor.

In Column 16, Line 9, delete "difference" and insert -- difference $\phi_x$ --, therefor.

Signed and Sealed this
Eighteenth Day of December, 2012

David J. Kappos
*Director of the United States Patent and Trademark Office*